US011501201B2

(12) United States Patent
Driscoll et al.

(10) Patent No.: US 11,501,201 B2
(45) Date of Patent: Nov. 15, 2022

(54) SYSTEMS, METHODS, AND APPARATUSES FOR TRAINING, STORAGE, AND INTERACTION WITH MACHINE LEARNING MODELS

(71) Applicant: MetiStream, Inc., McLean, VA (US)

(72) Inventors: Chiny Driscoll, McLean, VA (US); Donna-M. Fernandez, Falls Church, VA (US); Nathan G Salmon, Falls Church, VA (US)

(73) Assignee: METISTREAM, INC., McLean, VA (US)

( * ) Notice: Subject to any disclaimer, the term of this patent is extended or adjusted under 35 U.S.C. 154(b) by 923 days.

(21) Appl. No.: 15/651,433

(22) Filed: Jul. 17, 2017

(65) Prior Publication Data

US 2019/0019106 A1 Jan. 17, 2019

(51) Int. Cl.
*G06N 20/00* (2019.01)
(52) U.S. Cl.
CPC ................... *G06N 20/00* (2019.01)
(58) Field of Classification Search
CPC ..................................................... G06N 20/00
See application file for complete search history.

(56) References Cited

U.S. PATENT DOCUMENTS

| 6,988,241 | B1* | 1/2006 | Guttman | G06F 40/18 715/220 |
| 10,157,347 | B1* | 12/2018 | Kasturi | G06N 20/00 |
| 2007/0130205 | A1* | 6/2007 | Dengler | G06F 9/451 |
| 2014/0358825 | A1* | 12/2014 | Phillipps | G06Q 30/0241 706/11 |
| 2015/0379429 | A1* | 12/2015 | Lee | G06N 20/00 706/11 |
| 2016/0267110 | A1* | 9/2016 | deValk | G06F 16/25 |
| 2016/0300156 | A1* | 10/2016 | Bowers | G06N 20/00 |
| 2017/0124487 | A1* | 5/2017 | Szeto | G06F 11/1448 |
| 2018/0082191 | A1* | 3/2018 | Pearmain | G06N 5/025 |

\* cited by examiner

*Primary Examiner* — Casey R. Garner
(74) *Attorney, Agent, or Firm* — Staas & Halsey LLP

(57) ABSTRACT

A system includes a repository storing trained machine learning models and metadata corresponding to the trained machine learning models. The system provides an interface for performing operations on the trained machine learning models and corresponding metadata stored in the repository, and evaluates trained machine learning models that are linked to the data sources and stored in the repository to obtain resulting predictions for a payload of records of data contained in the data sources. A method includes configuring one or more data sources, ingesting training data from the configured data sources, identifying a scenario for prediction, training one or more machine learning models on the ingested training data for the identified scenario, reviewing performance of the trained machine learning models and storing the trained machine learning models and corresponding metadata in A model repository, and dynamically creating a user interface for interacting with the stored trained machine learning models.

11 Claims, 12 Drawing Sheets

| Ember | Management Console | Patient Search | Data Exploration | Log Out | Setting: outpatient |

Patient Search by Last Name | by First Name | by Medical Record Number

[Mefistream]

Search Results

| Last Name | First Name | Age | Gender | Birthdate | Medical Record Number |
|---|---|---|---|---|---|
| Allen | Jason | 40 | Male | 1978-01-29 | 872334879 |
| Anderson | James | 56 | Male | 1962-03-16 | 055933216 |
| Anderson | David | 73 | Male | 1944-10-17 | 702833431 |
| Avila | Jose | 68 | Male | 1949-11-23 | 269051048 |
| Baker | Eric | 45 | Male | 1973-06-06 | 093794681 |
| Barker | Thomas | 40 | Male | 1977-10-26 | 764404251 |
| Barrera | Michael | 36 | Male | 1981-07-29 | 485752666 |
| Boone | Jeffery | 42 | Male | 1976-06-06 | 338517950 |
| Boyer | Jonathan | 74 | Male | 1943-12-22 | 126551248 |
| Boyle | Jonathan | 60 | Male | 1957-06-30 | 722039955 |
| Brandt | Eric | 49 | Male | 1968-12-19 | 831377622 |
| Brown | Timothy | 59 | Male | 1859-02-04 | 752653857 |
| Brown | Dale | 37 | Male | 1980-10-26 | 834759932 |
| Brown | Luis | 65 | Male | 1953-05-09 | 131762066 |

Figure 5

Management Console

Model Information

✏️ Edit Model

| | |
|---|---|
| id | {"$oid":"593aa21c91009035D3f04a31"} |
| name | RandomForest_Diabetes |
| created_user | abc@metistream.com |
| organizations | [{"Metistream":"Organization1"}] |
| last_updater_user | abc@metistream.com |
| if_populate | true |
| setting | out-patient |
| cocktailNames | ["testCocktail"] |
| categoryList | ["Endocrinology"] |

Features

| Feature Name | Feature Type | |
|---|---|---|
| Num_times_pregnant | Double | ✏️ Edit Metadata |
| Plasma_glucose_concentration | Double | ✏️ Edit Metadata |
| Diastolic_blood_pressure | Double | ✏️ Edit Metadata |
| Tricep_skin_fold_thickness | Double | ✏️ Edit Metadata |
| 2H_serum_insulin | Double | ✏️ Edit Metadata |
| BMI | Double | ✏️ Edit Metadata |
| pedigree_function | Double | ✏️ Edit Metadata |
| age | Double | ✏️ Edit Metadata |
| prediction | Binary | ✏️ Edit Metadata |

Figure 10

SYSTEMS, METHODS, AND APPARATUSES FOR TRAINING, STORAGE, AND INTERACTION WITH MACHINE LEARNING MODELS

FIELD OF THE INVENTION

The present disclosure herein relates to one or more systems, methods, and apparatuses for the training, storing, and evaluation of one or more machine learning models, and in particular, the linking of one or more data sources to a model, and the generation and offering of model metadata via an application programming interface (API), to support functionality such as dynamic creation of model-specific user interfaces, and pre-population of user-selected record values from linked data sources to facilitate model interaction.

BACKGROUND

Machine learning is a sub-set of artificial intelligence in which algorithms are used to learn from input data to perform such tasks as finding correlations between various features and outcomes, classifying data into groups, and to making predictions. A machine learning model may be created by defining a set of features, and optionally a "label" data point, indicating a desired outcome. A model may then be trained on a data set with the specified features and an optional outcome. Once trained, a model may then be used to make predictions about new records.

In the industry today, machine learning models may be leveraged in a production environment in a number of ways. In one method, models may be deployed as services for ad-hoc evaluation of one or more records. However, current solutions for deploying machine learning models as services lack methods for discovering model details, such as its features, prediction type, and relevant linked data sources via the service at run time. This results in a lack of flexibility and a need to custom develop and tightly couple user interfaces and application integrations to specific models. These must be maintained and potentially modified as future updates are made to a deployed model and its linked data source schemas.

Additionally, once data is gathered for model training, a practice known as feature engineering is often performed to clean and massage the data into a format that is more beneficial for machine learning algorithms. Featurization techniques typically provide context to data to improve the quality of model training. For example, take a string representing an address. In its raw form, an address is only a string of text, but with additional context, it may be interpreted in many ways. Concepts like state, postal code, latitude, and longitude may be extracted which may produce improved correlations and model accuracy. From these extracted concepts, additional derivative concepts, such as climate trends, population could be generated as additional features for input to the model. These feature engineering steps are often performed statically on training data sets, producing new derivative data sets for model training which deviate from the original data source schema. Once a model is trained on this massaged data and is subsequently deployed, additional steps may be necessary to massage future data into an appropriate feature vector that contains all required data points needed for evaluation against the model. This requires the duplication of logic in multiple systems for model training, as well as any consuming applications and user interfaces, creating an environment that can be difficult to maintain.

It is typical to train a model on a subset of records from a data source with a defined schema, and evaluate future records from the same data source against the trained model. In production scenarios, it is often necessary for a consumer of a model to have knowledge of what data sources are relevant to which models, requiring the development of tools or application to interact with a desired data source, and the mapping of the data source schema to the required input feature vector for model evaluation. If multiple applications or user interfaces are to interact with a particular data source and models trained on it, this may result in duplicated effort.

SUMMARY OF THE INVENTION

A platform and system including a repository configured to store one or more trained machine learning models and to store metadata corresponding to each of the trained machine learning models. The system includes one or more processors coupled to the repository, the one or more processors being configured to provide an interface for performing operations on the trained machine learning models and corresponding metadata stored in the repository, and to evaluate one or more specific trained machine learning models that are linked to the one or more data sources and that are stored in the repository to obtain resulting predictions for a payload of one or more records of data contained in the one or more data sources. The operations may include one or more of creating, updating, reading, and deleting the trained machine learning models and corresponding metadata stored in the repository. The one or more data sources can be configured for use in the system. The interface may include a user interface provided via a web server for viewing and selecting the one or more records of data contained in the one or more data sources. The metadata corresponding to each of the trained machine learning models may be collected during model training of the respective trained machine learning model and correspond to one or more data sources that are linked to the respective trained machine learning model. The one or more processors may be configured to collect additional metadata corresponding to the one or more specific trained machine learning models and store the additional metadata in the repository with the corresponding trained machine learning models.

A method including storing, in a repository, one or more trained machine learning models and metadata corresponding to each of the trained machine learning models, providing an interface for performing operations on the trained machine learning models and corresponding metadata stored in the repository, linking one or more data sources to one or more specific trained machine learning models stored in the repository, and evaluating the one or more specific trained machine learning models to obtain resulting predictions for a payload of one or more records of data contained in the one or more data sources. The metadata corresponding to each of the trained machine learning models may be collected during model training of the respective trained machine learning model and correspond to one or more data sources that are linked to the respective trained machine learning model. The method may include collecting additional metadata corresponding to the one or more specific trained machine learning models and storing the additional metadata in the repository with the corresponding trained machine learning models.

A method including configuring one or more data sources, ingesting training data from the configured data sources, identifying a scenario for prediction, training one or more machine learning models on the ingested training data for the identified scenario, reviewing performance of the trained machine learning models and storing the trained machine learning models and the corresponding metadata in the model repository, and generating a dynamically created user interface for interacting with the trained machine learning models stored in the repository. The method may include interacting with the trained machine learning models stored in the repository via the dynamically created user interface served by a web server or via an application programming interface in custom applications provided by an application server. The method may include collecting additional metadata corresponding to the one or more specific trained machine learning models based on the reviewing and storing the additional metadata in the repository with the corresponding trained machine learning models.

BRIEF DESCRIPTION OF THE DRAWINGS

FIG. 5 is a screen shot of an example of a user interface provided via a web server for viewing and selecting records from configured data sources;

FIG. 10 is a screen shot of an example of an administrative user interface provided via a web server;

DETAILED DESCRIPTION OF THE EMBODIMENTS

Figure 1:
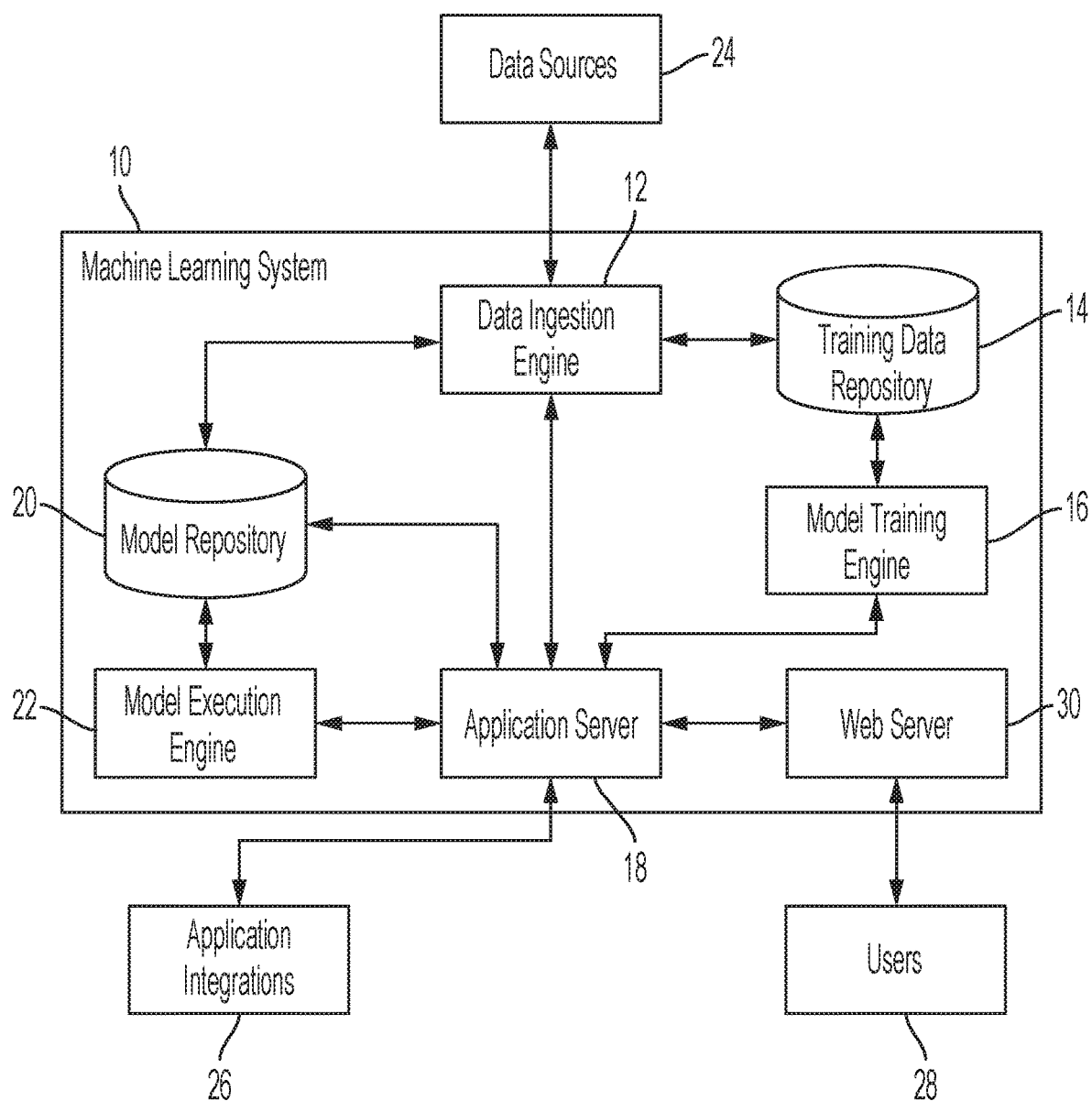
FIG. 1 is an interaction diagram displaying the interaction between various components of a system for data analysis.

In the following, various embodiments related to the inventive concept are described in detail with reference to the accompanying drawings. Like reference numerals in the drawings refer to like members.

FIG. 1 illustrates the various interactions between the components included in a system according to various embodiments disclosed herein. An example machine learning system 10 is comprised of a data ingestion engine 12, a training data repository 14, a model training engine 16, an application server 18, a model repository 20, and a model execution engine 22. The components of such a system 10 can interact with data sources 24, applications 26, and users 28.

The machine learning system 10 is used to create and train one or more machine learning models on a collection of data from one or more linked data sources 24. Operations on and interactions with trained models and their metadata are made available via an API of the application server 18, and a user interface is hosted via the web server 30 for user interaction with graphical representation of functionality offered by the API of the application server 14.

Data sources 24 may be configured for use on the platform, after which all or a portion of the data will be ingested into the platform by the data ingestion engine 12 and stored in the training data repository 14 for use in model training. Examples of data sources 24 include relational database management systems (RDBMS), representational state transfer (REST) services, queuing systems, and NoSQL style engines. Depending on the nature of the data source, various techniques such as polling, paging, batch, and streaming techniques may be employed to ingest the data on a one-time or on-going basis.

Models may be trained on all or a portion of the data ingested from a configured data source. Models may be trained on more than one data source by providing linking criteria relating the multiple data sources, such that records from each data source may be joined. Training a model on data from a data source links the model to the data source, such that new records in a configured data source may be easily evaluated against a trained model.

Rather than training a model on data which has been engineered with additional features prior to training, feature engineering steps are configured per model, and are performed real-time during model training by the model training engine 16, and model evaluation by the model execution engine 22, such that evaluation of models is performed against the data as it appears in the source system(s). This allows for simple interaction with a model without the need to understand the feature engineering steps necessary to get the data into the correct format to ensure compatibility with a given machine learning model.

Metadata is collected during model training pertaining to the linked data source, such as possible values, ranges of values, and statistics, such as mean, median, mode, of data source elements observed in the training data. This metadata is stored along with the model in a model repository 20, such that it may be retrieved from the application server 18.

Many machine learning algorithms, such as regression algorithms, allow for an understanding as to the weight or contribution of a given feature towards the prediction of a model. In these cases, this weight is also recorded for each feature in the model metadata at the conclusion of the model training process.

Machine learning techniques for Dimensionality Reduction, such as Principal Component Analysis, may reduce the number of required data source schema elements necessary for the evaluation of a record against a given model. In such a situation, the new reduced set of required data source schema elements is recorded in a model's metadata. This additional metadata about pertinent data source schema for a model can be leveraged in various model and data source interactions to limit the amount of data from a data source that is needed to be accessed and transmitted throughout the system for evaluation of a model.

A user interface is provided via the web server 30 for the viewing and selection of records from configured data sources. Once a record is selected, the prediction for a record as generated by each model supporting the record's data source is displayed. A model may be selected to view the details of the model's prediction. In the model detail user interface, the values of a record schema which map to features configured for a model are displayed. The pertinent record schema is pre-populated with the values of the selected record, and the prediction generated for the selected record by the selected model may be seen. The pertinent record schema values may be modified. The modification of pre-populated values results in the re-evaluation of the value set, and an updated prediction can be displayed.

Based on the types of data observed in each data source schema element, the user interface may automatically infer a recommended visualization for the representation of that datum in the model detail page. For example, a slider may be used to represent a continuous-type element, such as speed or temperature, while a list box may be used to display the possible values of a categorical-type element. Additional metadata may be recorded for a model to override the visualization to be used for a given data source schema element.

During model training, the model training engine 16 can collect metadata around model features, such as observed possible values, ranges of values, and statistics, such as mean, median, mode, of data source elements observed in the training data.

Model training performed by the model training engine 16 may employ the simultaneous training of multiple machine learning algorithms in order to find the algorithm which produces the best accuracy on the provided training data. At the conclusion of model training, model accuracy and statistical significance data is also stored with the metadata of the trained model.

Figure 4:
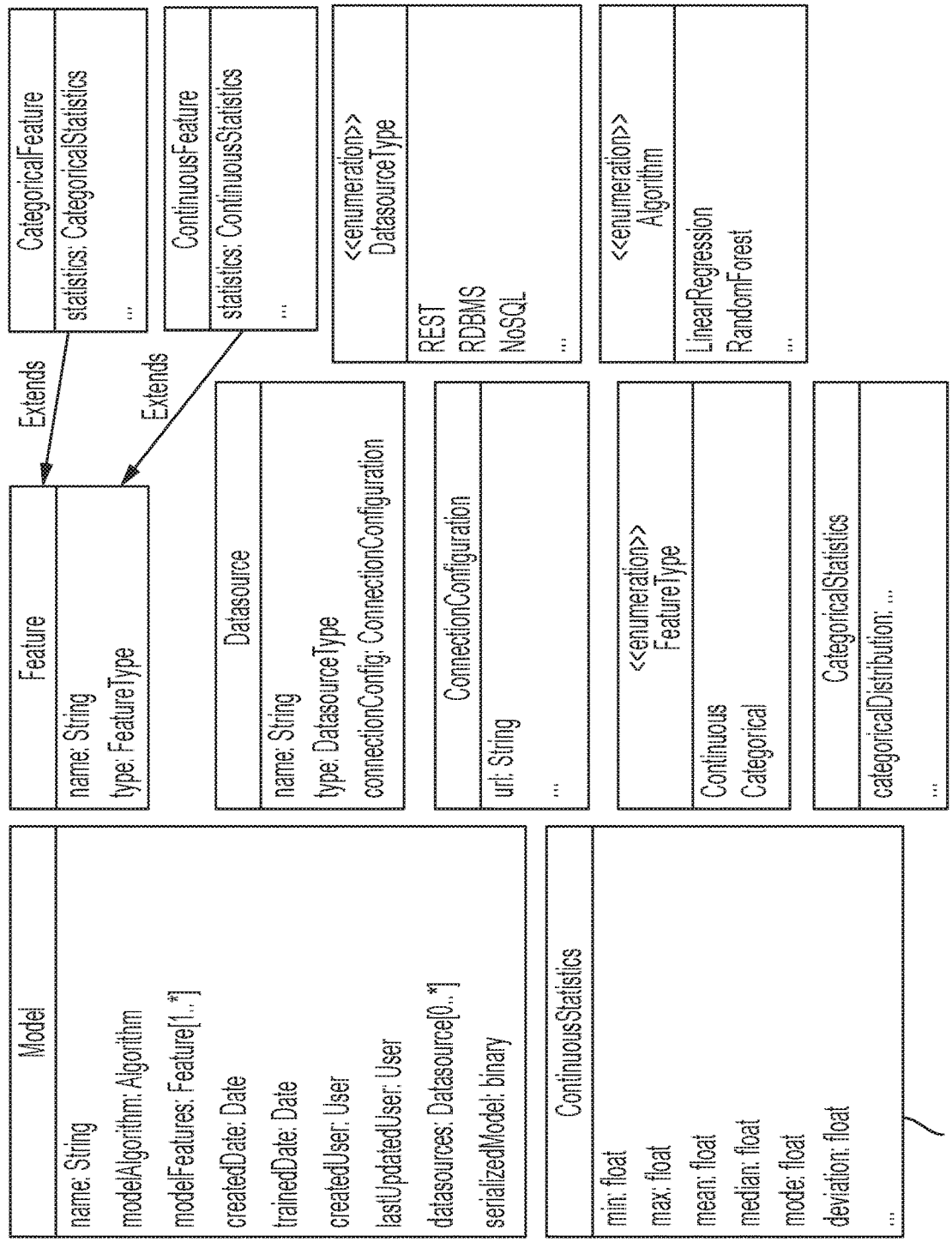
FIG. 4 is a UML diagram representing an example of a data model for models, along with associated features and data sources.

The trained models are stored in the model repository 20, where serialized models, their definitions, and associated metadata, as well as data source definitions are stored. FIG. 4 (discussed below) outlines an example unified modeling language (UML) model that could be used for the repository.

The model execution engine 22 retrieves model definitions from the model repository 20 and executes a provided data payload against the model definitions to obtain a prediction.

The application server 18 provides the API layer for access to the resources and supported actions of the machine learning system 10. All actions to add data sources 24, train models on configured data sources, perform actions and maintenance on data stored in the model repository 20, and evaluate data payloads against a model occur via this API. The application server 18 can provide results of the model execution to a variety of custom applications and to the web server 30.

The application server 18 may employ a user-based security model for authentication and authorization to control access to models, data sources, and API server operations. Concepts, such as organizational and role-based security, may also be employed to improve the flexibility and usability of the security model The web server 30 is accessible by users 28 and serves a graphical portal for administration of the system 10, and interaction with the system 10 for the training of and interaction with models.

Each of the data ingestion engine 12, training data repository 14, model training engine 16, application server 18, model repository 20, model execution engine 22, and web server 30 may include hardware and/or a special purpose computer programmed to perform the functions thereof.

Figure 2:
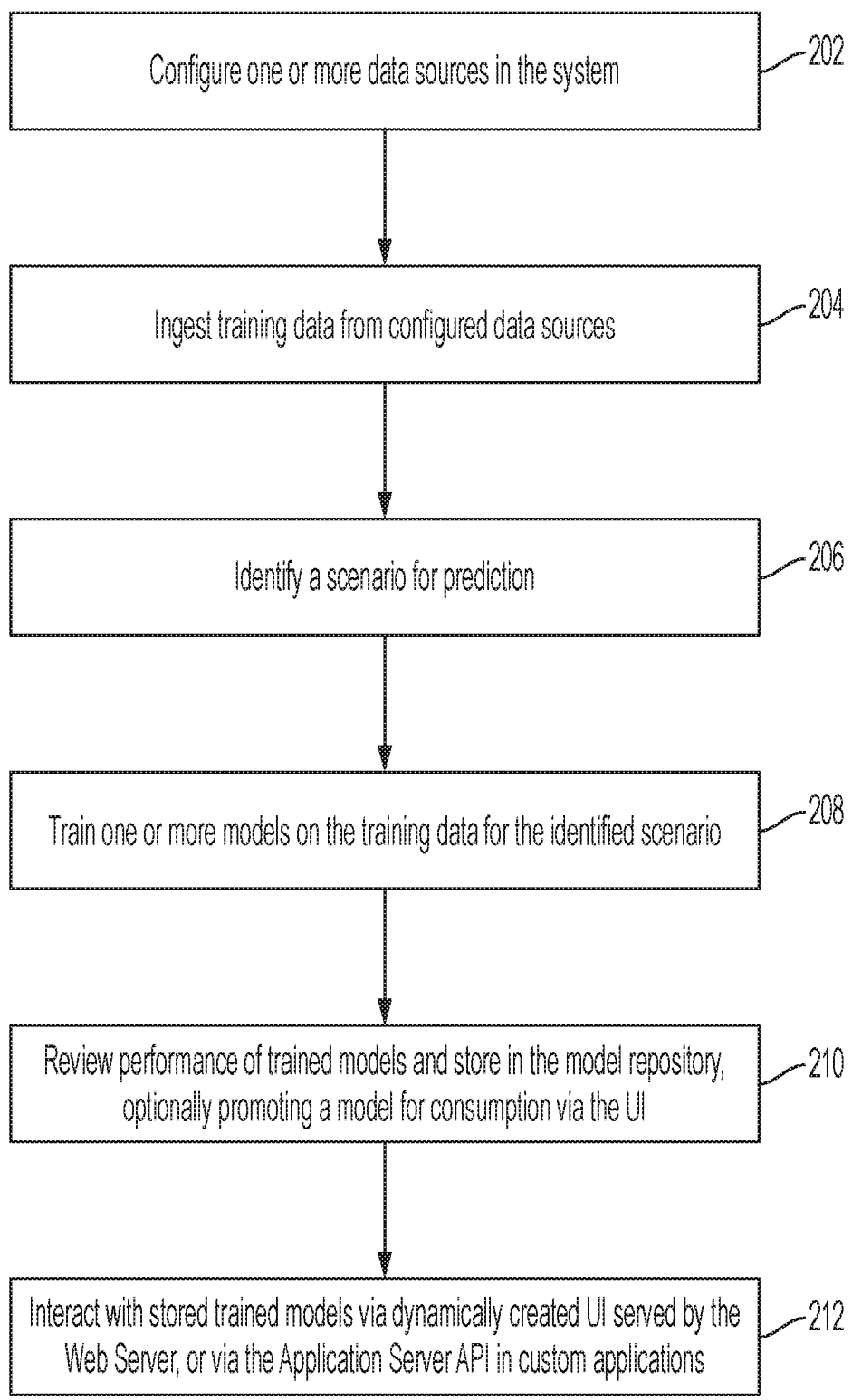
FIG. 2 is a flowchart displaying operations performed in a system for data analysis.

FIG. 2 illustrates a flowchart related to operations performed by one or more systems, methods, and apparatuses according to various embodiments disclosed herein. These operations may be performed by one or more of the data ingestion engine 12, training data repository 14, model training engine 16, application server 18, model repository 20, model execution engine 22, and web server 30 described above with respect to FIG. 1.

In operation 202, one or more data sources are configured in the system. In operation 204, training data is ingested from configured data sources. In operation 206, a scenario for prediction is identified.

In operation 208, one or more models are trained on the ingested training data for the identified scenario. In operation 210, performance of the models that are trained in operation 208 is reviewed and stored in the model repository, such as the model repository 20 described in FIG. 1. Optionally, operation 210 may also include promoting a model for consumption via a UI or REST service.

In operation 212, a user can interact with stored trained models via a dynamically created UI served by a web server, such as web server 30 described above with respect to FIG. 1, or via an API in custom applications, provided by an application server, such as application server 18 described above with respect to FIG. 1.

Figure 3:
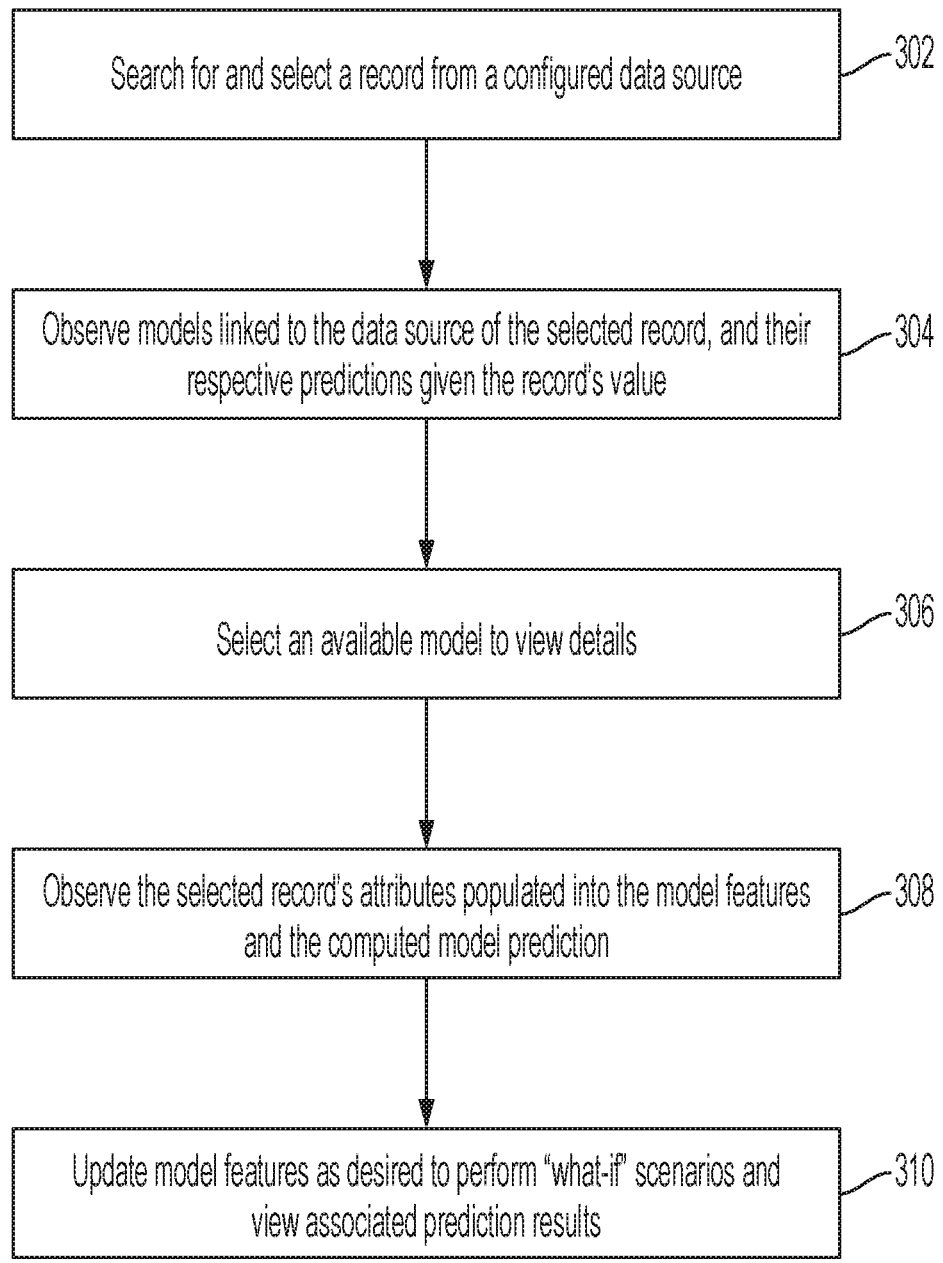
FIG. 3 is a flowchart displaying an example related to the interaction with dynamically generated model-specific user interfaces and their associated data sources.

FIG. 3 illustrates a flowchart related to operations performed by users with regard to interacting with trained models in the system and their linked data sources. These operations may be performed by one or more of the data ingestion engine 12, training data repository 14, model training engine 16, application server 18, model repository 20, model execution engine 22, and web server 30 described above with respect to FIG. 1.

In operation 302, a user can search for and select a record from a configured data source via a search interface hosted by the web server, directly via the application server API, or via a mobile or other application configured to interact with the application server API.

In operation 304, the user is presented with all models which support the data source from which the user searched for and selected a record for evaluation. In this way, the user can observe models linked to the data source of the selected record and observe the predictions of the models given the record's values. Each model may be represented by its name and its computed evaluation of the selected record.

In operation 306, the user selects a specific model in order to view the details of the record's evaluation. The end user is presented with a dynamically generated user interface specific to the selected model, which is generated based on the stored metadata. Each element of the selected record is pre-populated into the model's required elements of the linked data source's schema, as determined during model training. Each schema element is represented with a graphical element best suited to represent the type of datum. For example, a slider visualization may be used to represent a continuous-type element with a defined range, or a list box may be used to provide a listing of all possible values of a categorical-type element, in each case with the currently selected record's specific value preselected. These schema elements and corresponding values may be sorted by their contribution to the models prediction based on calculations of the record values and the weight of a given schema element, as stored in the model metadata computed during model training. This sorting allows the end user to see which aspects of a record contribute the most towards a model's evaluation of the record. Not all schema elements of a configured data source may be required by a model for evaluation due to dimensionality reduction that may have occurred during model training. As such, these schema elements may not appear on this user interface.

In operation 308, the user makes updates to the values in one or more of the schema elements pertinent to the model. Upon the changing of a value, the new set of values is sent to the application server, and subsequently the model execution engine to obtain a new evaluation, which is presented to the user in near real time. This allows the end user to perform "what-if" scenarios to explore how different aspects of a record and changes thereof might affect the evaluation of a record.

FIG. 4 is an example of a UML diagram 400 that may be used to store representations of models, their features, and linked data sources. In addition to metadata, the model definition could include a binary encoded serialized form of the trained model object. This object may be reconstituted by the model execution engine at run time in order to evaluate records against it.

FIGS. 5-8 illustrate a series of screen shots of examples of user interfaces that are provided via the web server 30. Such user interfaces are provided to the user, for example, using one or more wired or wireless user terminals provided to interact with the various embodiments of systems, apparatuses, and methods disclosed herein.

In FIG. 5, a user interface 50 is provided via the web server for the viewing and selecting of records 52 from configured data sources. For example, each record 52 of the user interface includes categories 54 such as last name, first name, age, gender, birth date, and medical record number. The categories for records are not limited to these specific categories or this specific number of categories.

Figure 6:
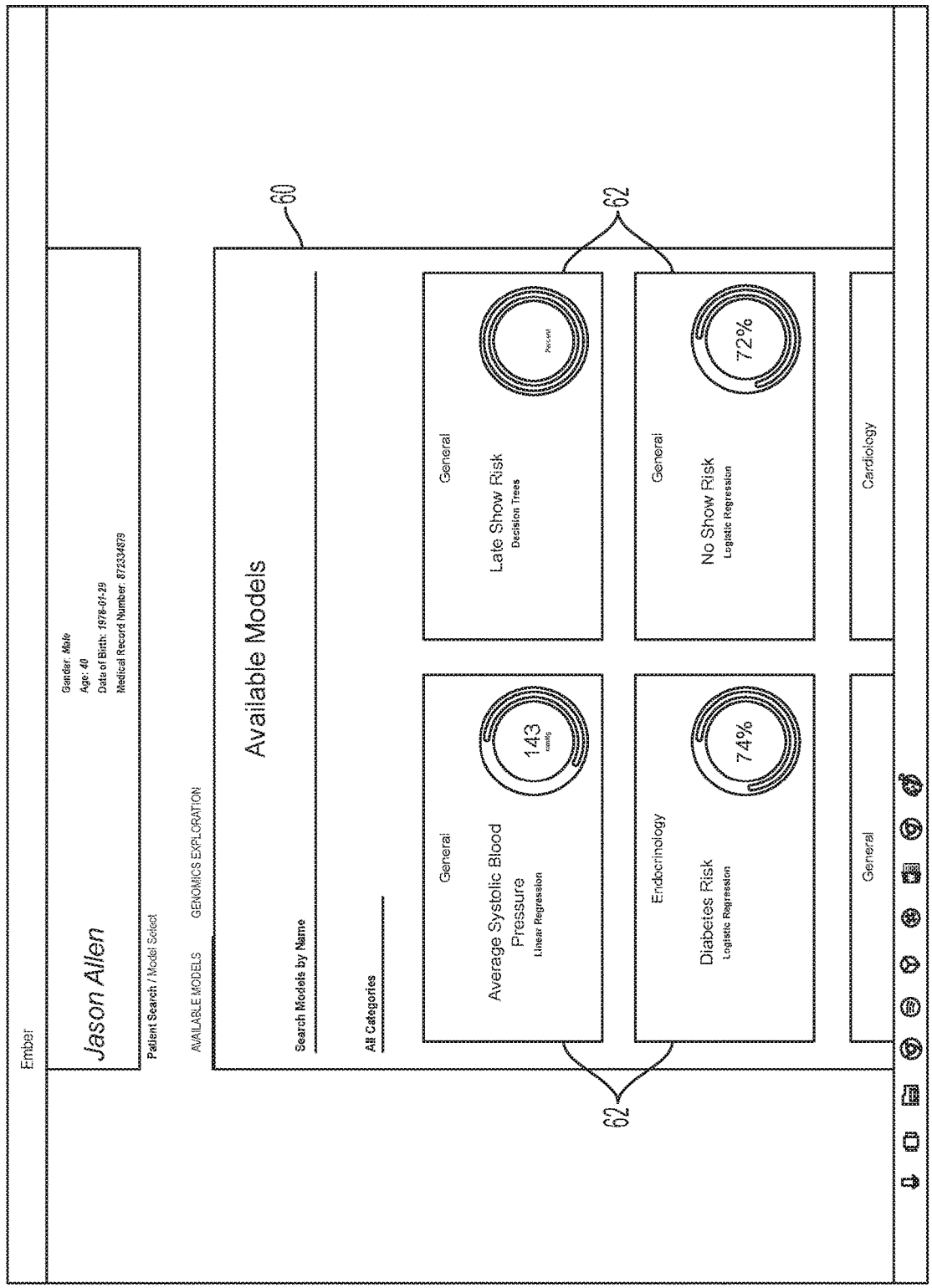
FIG. 6 is a screen shot of an example of a user interface provided via a web server for displaying a record generated by each model that supports the data source of a record selected from the interface illustrated in FIG. 5.

Once a record is selected, the prediction for a record as generated by each model supporting the record's data source is displayed, as illustrated in FIG. 6. For example, FIG. 6 represents a user interface 60 that may be displayed subsequent to the screen of FIG. 5 when the record corresponding to "Jason Allen" is selected in FIG. 5. FIG. 6 displays a series of models 62 that may be selected to view the details of the model's prediction.

Figure 7:
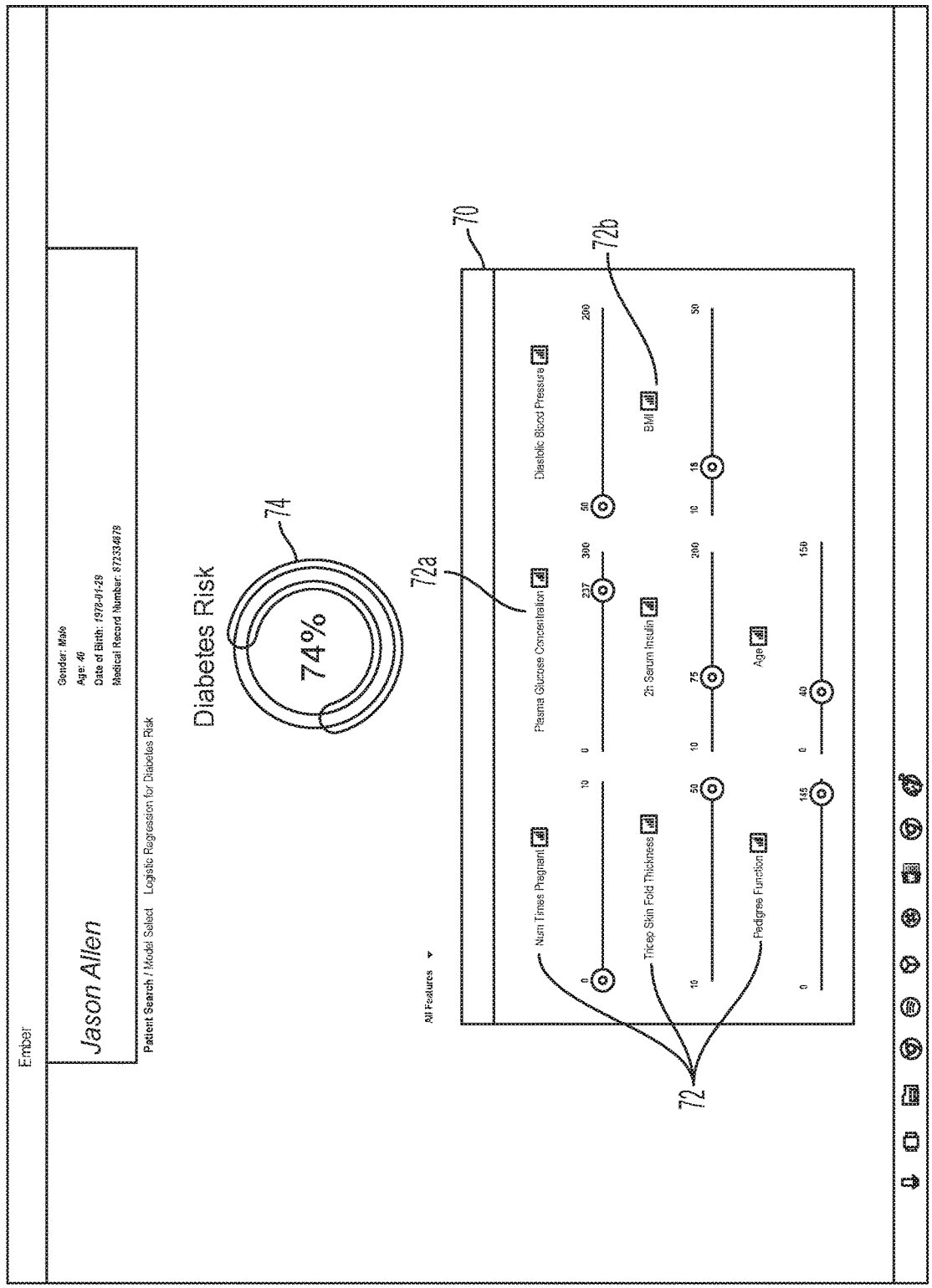
FIG. 7 is a screen shot of an example of a user interface provided via a web server for displaying the values of a record schema that map to features configured to a model selected from the interface illustrated in FIG. 6.

Once a model is selected, a model detail user interface 70 as illustrated in FIG. 7 can be displayed. In the user interface 70 of FIG. 7, the values of a record schema which map to features 72 configured for a model are displayed. The pertinent record schema is pre-populated with the values of the selected record, and the prediction 74 that is generated for the selected record (52 in FIG. 5) by the selected model (62 in FIG. 6) can be displayed.

Figure 8:
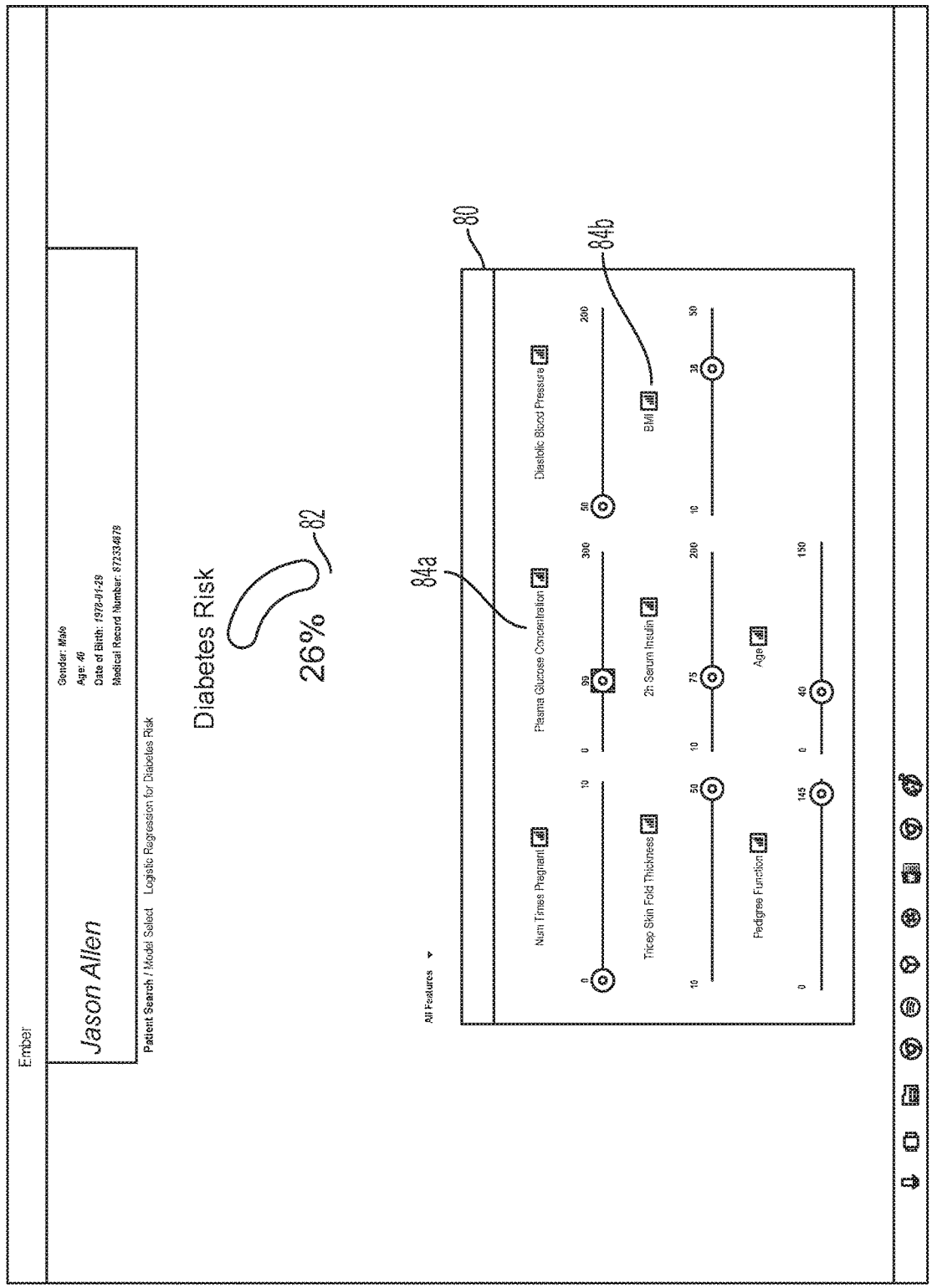
FIG. 8 is a screen shot of an example of a user interface provided via a web server for displaying values from the interface illustrated in FIG. 7 that have been modified to produce an updated prediction.
Figure 9:
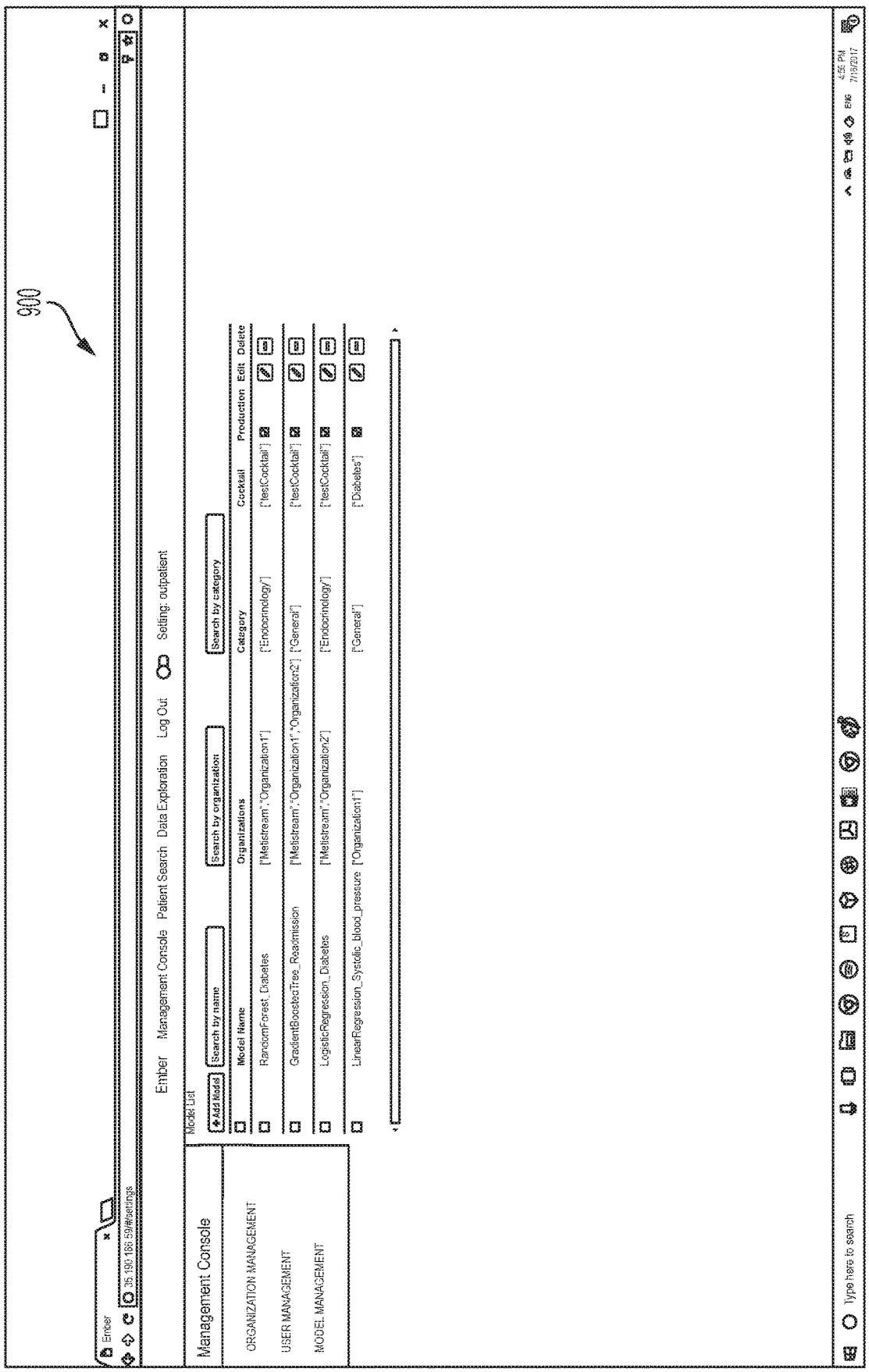
FIG. 9 is a screen shot of an example of an administrative user interface provided via a web server.
Figure 11:
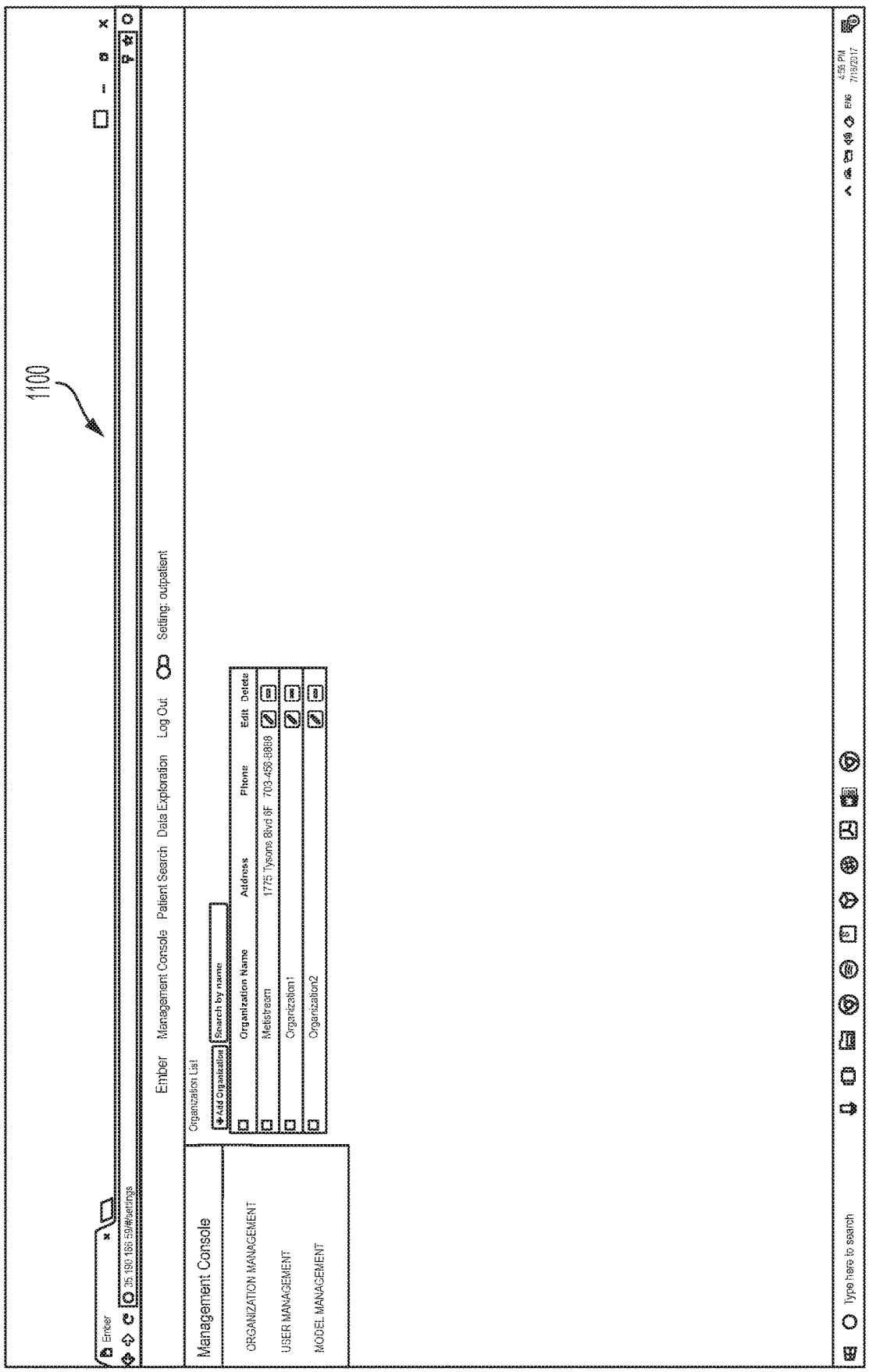
FIG. 11 is a screen shot of an example of an administrative user interface provided via a web server.
Figure 12:
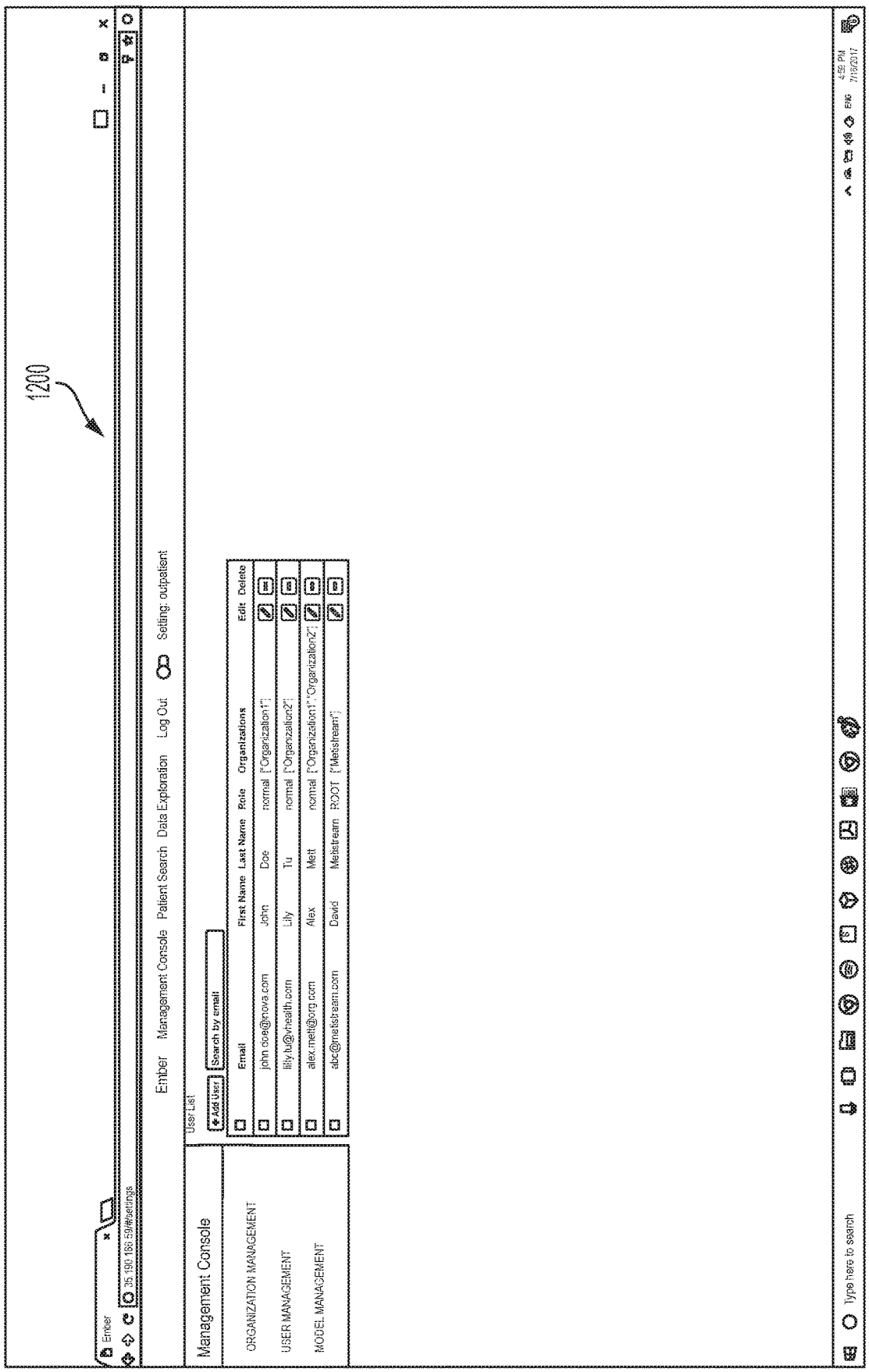
FIG. 12 is a screen shot of an example of an administrative user interface provided via a web server.

The pertinent record schema values may be modified. The modification of pre-populated values results in the re-evaluation of the value set, and an updated prediction 82 can be displayed in user interface 80, as shown in FIG. 8. For example, the value of feature 72a from FIG. 7 can be modified to reduce the value from 237 for "Plasma Glucose Concentration" to a value of 99, which is represented as feature 84a in the user interface of FIG. 8. Also, the value of feature 72b from FIG. 7 can be modified to reduce the value from 39 for "BMI" to a value of 18, which is represented as feature 84b in the user interface of FIG. 8. As a result of this modification, the prediction 74 in FIG. 7 has been changed to the prediction 82 in FIG. 8. In this case, a diabetes risk related to the Diabetes Risk model 62 from FIG. 6 and the patient record 52 of "Jason Allen" from FIG. 5 has been reduced from 74% to 26% as a result of a "what-if" scenario in which the patient's plasma glucose concentration has been reduced from a value of 237 to 99 and the patient's BMI has been reduced from 39 to 18.

FIGS. 9-12 illustrate a series of screen shots of examples of administrative user interfaces 900, 1000, 1100, and 1200 that may be provided via the web server 30. Such administrative user interfaces are provided to an administrator, for example, using one or more wired or wireless user terminals provided to interact with the various embodiments of systems, apparatuses, and methods disclosed herein.

An administration user interface is supplied via the web server 30 which supports activities related to the configuration and administration of data sources, models, model metadata, and model preferences for associated features. This includes providing optional overrides for possible values and value ranges for configured model features stored in the model metadata. Reasons for this may include that there exists a defined range or set of values for a given feature, such as a temperature range, or list of possible answers for a multiple choice question in a test. Even though certain values may not be observed in the model training data, it may still be desired to encode this information into the model metadata. Where applicable, unit information for a data source schema element may also be provided. While this unit information is typically only used for informational and display purposes, in special cases, the unit type may allow for recommendations for the visualization used in the user interface for the representation of a given data source schema element. For example, in an automatically generated user interface for a model as described above, for a record schema element pertaining to test grades, it may be more intuitive to represent a range of values from 0% to 100%, rather than only the range of values observed during model training, which may not encompass the full range of possible real-world values.

In the above-description of various embodiments, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the various embodiments are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The descriptions of the various embodiments have been presented for the purpose of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A system, comprising:
   a repository configured to store a plurality of trained machine learning models and to store, for a trained machine learning model, among the plurality of trained machine learning models, a plurality of metadata respectively corresponding to data elements, including information about values for the data elements, of a schema of a data source linked to prediction features of the trained machine learning model;
   one or more processors coupled to the repository, the one or more processors being configured to:
      retrieve, from the repository, data elements, based on a schema of a data source linked to the trained machine learning model, the data elements selected to represent prediction features, respectively, in an identified scenario for a prediction during a training of the trained machine learning model in a sorted order according to a contribution of a selected prediction feature, among the prediction features, to the identified scenario for the prediction based on a weight given to the selected prediction feature and a calculation of a record value of the selected prediction feature;

store in the repository, for the trained machine learning model, a plurality of metadata respectively corresponding to the selected data elements, including information about possible values for the selected data elements, thereby causing the selected data elements to be dynamically linkable to the prediction features in the identified scenario for generation of a user interface (UI) to dynamically interact with the trained machine learning model;

obtain a data record from the data source in response to a selection;

generate, automatically, dynamically, based on respective metadata of the plurality of metadata and the data record, corresponding user interfaces (UIs),
each UI of the UIs corresponding, based on the respective metadata, to the prediction features in the identified scenario to:
display, based on the respective metadata and the data record, a visual representation of the prediction features in the identified scenario based on the sorted order according to the weight and the calculation of the record value for the selected prediction feature, including information about possible values for the prediction features in the identified scenario,
to perform first operations on changing, through the UI, a payload of data associated with the obtained data record, resulting in a new identified scenario in form of a dynamic update to the UI to interact with the prediction features in the identified scenario through the new identified scenario based on the changed payload of data,
the dynamic update to the UI including,
an automatic computing based on the trained machine learning model of a resulting prediction and a contribution of a prediction feature, among the prediction features, to a resulting prediction in the new identified scenario, and
an automatic display of the resulting prediction in the new identified scenario,
the resulting prediction based on the changing payload of data indicating the computed contribution of the prediction feature in the new identified scenario in form of an evaluation presented in real-time in the display to a user of the new identified scenario based on the changed payload of data against the identified scenario.

2. The system according to claim 1, wherein the UI is further configured for executing second operations which include one or more of creating, updating, reading, and deleting the trained machine learning models and corresponding metadata stored in the repository.

3. The system according to claim 1, wherein the UI is provided via a web server for viewing and selecting the payload of data.

4. The system according to claim 1, wherein the respective metadata is collected during a training of the trained machine learning model and corresponded to the data source linked to the trained machine learning model, and
the one or more processors being further configured to,
generate a model UI displaying selections representing the plurality of trained machine learning models, and
in response to a selection, through the model UI, of the trained machine learning model, obtain the respective metadata from the repository, the selected data elements, and a data record from the data source, to automatically, dynamically, generate the UI corresponding to the trained machine learning model.

5. The system according to claim 1, wherein the possible value information includes information to provide an override for a value or a range of values associated with the prediction feature, or information controlling visualization of the prediction feature in the UI, resulting in an updated visualization of the predictive feature in the UI.

6. A non-transitory computer readable medium that stores instructions, which when executed by a computer execute a process comprising:

storing, in a repository, for a trained machine learning model, among a plurality of trained machine learning models, a plurality of metadata respectively corresponding to data elements, including information about values for the data elements, of a schema of a data source linked to prediction features of the trained machine learning model;

retrieve data elements, based on a schema of a data source linked to the trained machine learning model, the data elements selected to represent prediction features, respectively, in an identified scenario for a prediction during a training of the trained machine learning model in a sorted order according to a contribution of a selected prediction feature, among the prediction features, to the identified scenario for the prediction based on a weight given to the selected prediction feature and a calculation of a record value of the selected prediction feature;

storing in the repository, for the trained machine learning model, a plurality of metadata respectively corresponding to the selected data elements, including information about possible values for the selected data elements, thereby causing the selected data elements to be dynamically linkable to the prediction features in the identified scenario for generation of a user interface (UI) to dynamically interact with the trained machine learning model;

obtaining a data record from the data source in response to a selection;

generating, automatically, dynamically, based on respective metadata of the plurality of metadata and the data record, corresponding user interfaces (UIs),
each UI of the UIs corresponding, based on the respective metadata, to the prediction features in the identified scenario to:
display, based on the respective metadata and the data record, a visual representation of the prediction features in the identified scenario based on the sorted order according to the weight and the calculation of the record value for the selected prediction feature, including information about possible values for the prediction features in the identified scenario,
to perform first operations on changing, through the UI, a payload of data associated with the obtained data record, resulting in a new identified scenario in form of a dynamic update to the UI to interact with the prediction features in the identified scenario through the new identified scenario based on the changed payload of data, the dynamic update to the UI including, an automatic computing based on the trained machine learning model of a resulting prediction and a contribution of a prediction feature, among the prediction features, to a resulting prediction in the new identified scenario, and an automatic display of the resulting prediction in the new identified scenario, the resulting prediction based on the changing payload of data indicating the computed contribution of the prediction feature in the new identified scenario in form of an evaluation presented in real-time in the display to a user of the new identified scenario based on the changed payload of data against the identified scenario.

7. The non-transitory computer readable medium according to claim 6, wherein the metadata is collected during a training of the trained machine learning model and corresponded to the data source linked to the trained machine learning model, and the process further comprises, generating a model UI displaying selections representing the plurality of trained machine learning models, and in response to a selection, through the model UI, of the trained machine learning model, obtaining the respective metadata from the repository, the selected data elements, and a data record from the data source, to automatically dynamically generate the UI corresponding to the trained machine learning model.

8. The non-transitory computer readable medium according to claim 7, wherein the possible value information includes information to provide an override for a value or a range of value associated with the prediction feature, or information controlling visualization of the prediction feature in the UI, resulting in an updated visualization of the prediction feature in the UI.

9. A method comprising:

by a computer system, storing a plurality of machine learning models;

configuring a plurality of data sources for use in the system;

ingesting training data from a data source, from among the plurality of configured data sources;

identifying a scenario for a prediction;

training a machine learning model, from among the plurality of machine learning models, on the ingested training data for the identified scenario to link the data source to the trained machine learning model;

retrieve, from the repository, data elements, based on a schema of the data source linked to the trained machine learning model, the data elements selected to represent prediction features, respectively, in the identified scenario for the prediction during the training of the trained machine learning model in a sorted order according to a contribution of a selected prediction feature, among the prediction features, to the identified scenario for the prediction based on a weight given to the selected prediction feature and a calculation of a record value of the selected prediction feature;

storing, for trained machine learning model, a plurality of metadata respectively corresponding to data elements, including information about possible values for the selected data elements, thereby causing the selected data elements to be dynamically linkable to the prediction features in the identified scenario for generation of a user interface (UI) to dynamically interact with the trained machine learning model;

obtain a data record from the data source in response to a selection;

generating, automatically, dynamically, based on respective metadata of the plurality of metadata and the data record, corresponding user interfaces (UIs), each UI of the UIs corresponding, based on the respective metadata, to the prediction features in the identified scenario to:

display, based on the respective metadata and the data record, a visual representation of the prediction features, in the identified scenario based on the sorted order according to the weight and the calculation of the record value for selected the prediction feature including information about possible values for the prediction features in the identified scenario, to perform first operations on changing, through the UI, a payload of data associated with the obtained data record, resulting in a new identified scenario in form of a dynamic update to the UI to interact with the prediction features in the identified scenario through the new identified scenario based on the changed payload of data, the dynamic update to the UI including, an automatic computing based on the trained machine learning model of a resulting prediction and a contribution of a prediction feature, among the prediction features, to a resulting prediction in the new identified scenario, and an automatic display of the resulting prediction in the new identified scenario, the resulting prediction based on the changing payload of data indicating the computed contribution of the prediction feature in the new identified scenario in form of an evaluation presented in real-time in the display to a user of the new identified scenario based on the changed payload of data against the identified scenario.

10. The method according to claim 9, further comprising: interacting with the trained machine learning model through the automatically dynamically created UI served by a web server or through an application programming interface in an application provided by an application server.

11. The method according to claim 9, wherein the possible value information includes information to provide an override for a possible value or a range of value associated with the prediction feature, or information controlling visualization of the prediction feature in the UI, resulting in an updated visualization of the prediction feature in the UI.

* * * * *

UNITED STATES PATENT AND TRADEMARK OFFICE
CERTIFICATE OF CORRECTION

| | |
|---|---|
| PATENT NO. | : 11,501,201 B2 |
| APPLICATION NO. | : 15/651433 |
| DATED | : November 15, 2022 |
| INVENTOR(S) | : Chiny Driscoll et al. |

It is certified that error appears in the above-identified patent and that said Letters Patent is hereby corrected as shown below:

On the Title Page

Column 2, item (57) (Abstract), Line 16:
Delete "A model" and insert -- a model --.

In the Claims

Column 11, Line 24:
In Claim 1, delete "UIs" and insert -- UIs --.

Column 12, Line 53:
In Claim 6, delete "UIs" and insert -- UIs --.

Column 14, Line 17:
In Claim 9, delete "UIs" and insert -- UIs --.

Signed and Sealed this
Tenth Day of January, 2023

Katherine Kelly Vidal
*Director of the United States Patent and Trademark Office*